United States Patent
Yamakawa et al.

(10) Patent No.: US 10,079,786 B2
(45) Date of Patent: Sep. 18, 2018

(54) METHODS AND APPARATUS FOR ENHANCING DEVICE MESSAGING

(75) Inventors: Devender Akira Yamakawa, San Diego, CA (US); Kameron N. Kerger, San Diego, CA (US); Paul J. Lafata, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 923 days.

(21) Appl. No.: 13/602,247

(22) Filed: Sep. 3, 2012

(65) Prior Publication Data

US 2014/0067965 A1 Mar. 6, 2014

(51) Int. Cl.
*H04L 12/58* (2006.01)
*G06F 3/16* (2006.01)
*H04L 29/08* (2006.01)

(52) U.S. Cl.
CPC ............. *H04L 51/04* (2013.01); *G06F 3/167* (2013.01); *H04L 51/06* (2013.01); *H04L 51/12* (2013.01); *H04L 51/18* (2013.01); *H04L 51/24* (2013.01); *H04L 67/22* (2013.01)

(58) Field of Classification Search
CPC ..... H04L 51/04; H04L 51/043; H04L 12/581; H04L 12/5815; H04L 67/22; H04L 51/24; H04L 51/18; H04L 51/06; H04L 51/12; G06F 3/167
See application file for complete search history.

(56) References Cited

U.S. PATENT DOCUMENTS

| | | | |
|---|---|---|---|
| 6,519,639 B1* | 2/2003 | Glasser et al. | 709/224 |
| 7,305,627 B2 | 12/2007 | Tannenbaum et al. | |
| 7,356,567 B2* | 4/2008 | Odell et al. | 709/206 |
| 7,366,779 B1* | 4/2008 | Crawford | 709/227 |
| 7,769,811 B2 | 8/2010 | Heikes et al. | |
| 7,818,375 B2 | 10/2010 | Malik et al. | |
| 7,996,775 B2* | 8/2011 | Cole et al. | 715/752 |
| 9,003,306 B2* | 4/2015 | Mehin et al. | 715/758 |
| 9,959,037 B2* | 5/2018 | Chaudhri | G06F 3/04883 |
| 2004/0078441 A1* | 4/2004 | Malik et al. | 709/206 |
| 2004/0162877 A1* | 8/2004 | Van Dok et al. | 709/204 |
| 2005/0027669 A1 | 2/2005 | Day et al. | |
| 2005/0027839 A1* | 2/2005 | Day et al. | 709/223 |
| 2008/0201438 A1* | 8/2008 | Mandre | 709/206 |
| 2009/0222523 A1 | 9/2009 | Williams | |
| 2011/0061017 A1 | 3/2011 | Ullrich et al. | |
| 2012/0023175 A1 | 1/2012 | DeLuca | |
| 2014/0067965 A1* | 3/2014 | Yamakawa et al. | 709/206 |
| 2017/0346767 A1 | 11/2017 | Yamakawa et al. | |

FOREIGN PATENT DOCUMENTS

CN 101366210 A 2/2009
CN 102598035 A 7/2012

OTHER PUBLICATIONS

International Search Report and Written Opinion—PCT/US2013/054919—ISA/EPO—Oct. 23, 2013.

* cited by examiner

*Primary Examiner* — Gregory Todd
(74) *Attorney, Agent, or Firm* — MG-IP Law, P.C.

(57) ABSTRACT

The present disclosure provides methods and apparatus for enhanced messaging. Specifically, methods and apparatus are presented for transmitting a communication characteristic indicator of a communication message substantially simultaneous to an input of data defining at least a portion of the communication message at the sending device. In one aspect, the communication characteristic indicator represents one or more characteristics of the data.

42 Claims, 12 Drawing Sheets

METHODS AND APPARATUS FOR ENHANCING DEVICE MESSAGING

BACKGROUND

Aspects of the present disclosure relate generally to communication systems, and more particularly, to optimizing communication between user-controlled devices via messaging.

In computer-to-computer or mobile-to-mobile communication programs, such as instant messaging clients, a receiving user may receive a visual indication that a sending user is currently typing a message. For example, in some clients, the device user may see a status of the sending user, such as "The other user is typing . . . " while the sending user composes the message. Little information or subtleties concerning the characteristics or contents of the message can be garnered, however, from such a static indication. For example, the receiving user is not made aware of the speed, corrections, inflection, pace, etc., of the input or typing of the sending user.

Because of the static nature of this legacy indication, a user for whom a message is being composed is unable to make inferences about the content of the message or the circumstances surrounding its composition. For example, in traditional messaging clients, a user is unable to tell if the user with whom he or she is communicating is typing feverishly, which may indicate excitement, anger, or rage on the part of the other user. Alternatively, in traditional messaging clients, a message receiver is unable to follow the input patterns, such as text addition and deletion, of the sending user, which may indicate cautiousness or deliberateness on the part of the other user. Thus, improved methods of messaging are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one or more aspects of the present disclosure, presented is a method of electronic communication. The method may include receiving a communication characteristic indicator of a communication message substantially simultaneous to an input of data defining at least a portion of the communication message. In an additional exemplary aspect, the communication characteristic indicator represents one or more characteristics of the data.

Further presented herein is a device including at least one processor configured to communicate electronically. Such a device may include a module for receiving a communication characteristic indicator of a communication message. In an aspect, the communication characteristic indicator may be received substantially simultaneous to an input of data defining at least a portion of the communication message at the sending device.

In an aspect, the present disclosure presents aspects of a computer program product, which includes a computer-readable medium. The computer-readable medium may contain at least one instruction for causing a computer to transmit a communication characteristic indicator of a communication message substantially simultaneous to an input of data defining at least a portion of the communication message at a sending device. The communication characteristic indicator can represent one or more characteristics of the data.

Moreover, the present description presents, in one or more aspects, an apparatus for electronic communication. The apparatus may include a signal receiver component configured to receive a communication characteristic indicator of a communication message substantially simultaneous to an input of data defining at least a portion of the communication message at the sending device. The communication characteristic indicator of this apparatus may represent one or more characteristics of the data.

In one or more aspects, a method of electronic communication is provided. The method may include transmitting a communication characteristic indicator of a communication message substantially simultaneous to an input of data defining at least a portion of the communication message at a sending device. In an additional aspect of this method, the communication characteristic indicator may represent one or more characteristics of the data.

Additionally, in yet one or more aspects, at least one processor configured to communicate electronically is provided. The processor includes a module for transmitting a communication characteristic indicator of a communication message. In an aspect, the communication characteristic indicator may be transmitted substantially simultaneous to an input of data defining at least a portion of the communication message at a sending device. Furthermore, the communication characteristic indicator of this device may represent one or more characteristics of the data.

Further, in one or more aspects an apparatus for electronic communication is provided. The apparatus may include a signal transmitter component configured to transmit a communication characteristic indicator of a communication message substantially simultaneous to an input of data defining at least a portion of the communication message at a sending device. In one aspect, the communication characteristic indicator may represent one or more characteristics of the data.

In one or more additional aspects, a computer program product including a computer-readable medium is provided. The computer-readable medium includes at least one instruction for causing the computer to transmit a communication characteristic indicator of a communication message to a receiving device substantially simultaneous to an input of data defining at least a portion of the communication message at a sending device. In one aspect, the communication characteristic indicator represents one or more characteristics of the data.

According to one or more further aspects, an apparatus for electronic communication is provided. The apparatus includes means for transmitting a communication characteristic indicator of a communication message to a receiving device substantially simultaneous to an input of data defining at least a portion of the communication message at a sending device. In one aspect, the communication characteristic indicator represents one or more characteristics of the data.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
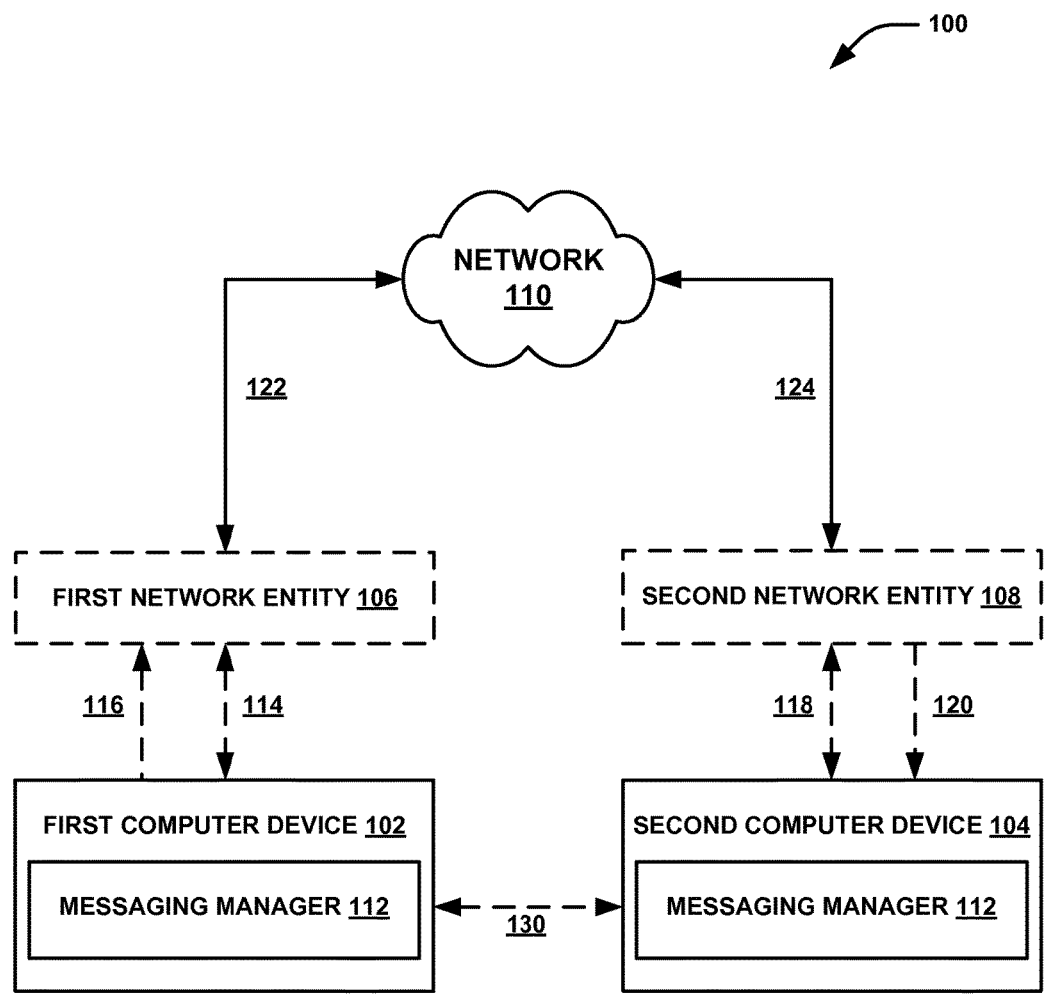
FIG. 1 is a system-level block diagram illustrating aspects of a messaging system according to one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

According to one or more aspects of the present disclosure, described are methods and apparatus for improved messaging that utilize one or more communication characteristic indicators, which a receiving user may receive before receiving a completed version of a communication. Such a communication characteristic indicator may provide a receiving user with a visual, auditory, and/or tactile representation of a speed, direction (e.g., typing, deleting, etc.), rate, inflection, pace, etc., of the in-progress input from the sending user. Furthermore, according to one or more aspects, the communication characteristic indicator may update substantially simultaneous to the inputting of data by the sending user, but before completion of the communication message, such as before receiving a command to "send" the completed communication or message to the receiving device. For example, in one aspect of a visual representation, a user interface in an instant messaging program may appear to mimic, in substantially real time, the input of the sending user in a chat window—except that the visual representation of the actual input is blurred or otherwise obfuscated so as to conceal the actual contents of the communication, e.g. a message, which is still being composed by the sending user. In an auditory or tactile representation example, a computer device may reproduce a sound or vibration, depending on the input of the sending user, which the receiving user may hear or feel. For example, the receiving computer device may generate an output at a user interface such that the user may hear a "tap, tap, tap" sound, or any pre-recorded sound corresponding to a respective input key, or feel a vibration, mimicking the input speed, direction, rate, etc. of the communication being composed by the sending user. In addition, these communication characteristic indicators, which may also be referred to as pre-messages, may be received and indicated to the receiving user before a communication is initiated, or before a first message in a communication. As such, in one or more examples, the present apparatus and methods provide a computer device of the receiving user receiving a real-time indication that a sending user, for example, is typing an initial message and that receipt of the message, or the beginning of a conversation, is imminent.

In an aspect, this "real time" representation of the communication or message of another user may be accomplished by sending intermittent pre-messages, or communication characteristic indicators, to the device of the receiving user before the sending user sends a completed version of the message to the receiving user. As such, the receiving user may receive characteristics of a message being composed by a sending user and may draw conclusions or make assumptions about the message being composed from the characteristics, thereby creating anticipation, engagement, and a more informed communication.

Referring to FIG. 1, a communication system 100 is illustrated that provides for improved messaging between computer devices, according to one or more aspects. For example, system 100 may facilitate improved messaging between a first computer device 102 and a second computer device 104. In an aspect, first computer device 102 may be a sending device, and may therefore be configured to transmit one or more messages 116 destined for a receiving device, which may be second computer device 104. In some aspects, the one or more messages 116 from first computer device 102 may be received as a corresponding one or more messages 120 at second computer device 104. However, both first computer device 102 and second computer device 104 may be configured to send and receive messages 116 and/or 120.

In an aspect, message 116 and/or 120 may be pre-messages that may include information associated with one or more characteristics of an in-process message being input into the sending device. As used herein, a pre-message includes any message transmitted to a receiving computer device prior to completion of inputting and finalization confirmation of the complete communication message at the sending device. For example, the completion of the communication message may be indicated by receiving a selection of a "send" key (e.g. the "return" or "enter" key on a keyboard) on the sending device. As such, as data is being input into the in-process message or non-complete message, one or more pre-messages may be intermittently generated and transmitted to the receiving computer device that include one or more characteristics of the in-process message. Such characteristics may be defined by one or more communication characteristic indicators included in a pre-message. Moreover, such communication characteristic indicators are configured to initiate an output on the receiving computer device representing the respective characteristic; however, such an output may be illegible otherwise obfuscated such that the actual input cannot be perceived. As such, a pre-message including one or more communication characteristic indicators conveys one or more features that define the input of data to the in-process message, however, prohibits the conveyance of an actual representation of the input data.

In one additional aspect, the pre-messages may further include at least a portion of the message data itself. As these pre-messages are received at the receiving device, the individual message data portions contained in each of the intermittently received pre-messages may be stored in a memory. Thereafter, based on the user indicating that the communication message is complete, the sending device may send an indicator or electronic key in a communication message completion indication message to the receiving device. Upon receipt of the communication message completion indication message at the receiving device, the receiving device may decode the communication message completion indication message, which includes the indication or electronic key. Based on the contents of the communication message completion indication message, the receiving device may read each of the previously stored individual message data portions from memory, concatenate the individual message data portions to create the completed communication message, and/or unblurr the response or otherwise produce a legible version of the completed communication message to the user.

In an alternative or additional aspect, the pre-messages may not include the individual message data portions. Instead, the pre-messages may instead simply contain the communication characteristic indicator from which the receiving device may produce a corresponding response. Furthermore, in an aspect, where the pre-message does not contain individual message data portions, the sending device may transmit the data (e.g. text data, ASCII code, or the like) comprising the entirety of the completed message as a result of the user indicating that the communication message is complete. Additionally, according to this aspect, the sending device may also generate and/or transmit a communication message completion indication message to the receiving device upon the user indicating that the communication message is complete. In an aspect, the communication message completion indication message may be appended to the data comprising the entirety of the completed communication message and transmitted to the receiving device as a single message. Alternatively, the data and the communication message completion indication message may be transmitted separately. Furthermore, as used in the present description, any one or more of the terms "message" (e.g. message 116 and/or 120), "pre-message," "in-process message," "completed message," and any other permutation of "message" may correspond to a "communication message." In other words, as used herein, the term "communication message" may be any electronic representation of a portion or all of a message associated with a messaging session.

In a further aspect, the receiving device may also generate and provide the receiving device user with a pre-session response based on the device receiving one or more pre-messages before the initiation of a messaging session (e.g. before any device involved in a messaging session transmits a completed message to a receiving device). For example, where a sending user is typing an initial message of a messaging session on the sending device, the sending device may generate and transmit one or more pre-messages associated with the initial message to the receiving device. In an aspect, upon receipt of at least one of the one or more pre-messages, the receiving device may generate a user interface on a display, a sound, and/or a tactile response or any combination thereof for presentation to the receiving user, wherein the user interface, sound, and/or tactile response of any combination thereof may indicate that the user is composing an initial message of a potential messaging session.

In one aspect of an example pre-session response, the receiving device may display a graphical user interface (GUI) to the user based on receiving one or more pre-session pre-messages. In an aspect, the GUI may include one or more windows, wherein the one or more windows may be windows associated with the messaging client in use by the users and/or the sending device and receiving device. For example, the receiving device may display a chat window to the receiving user. Such operation may provide a receiving user a "pre-warning" that an initial message of a messaging session is imminent.

In a further aspect, sending device may generate and transmit the pre-messages intermittently based on a frequency and/or a trigger. For example, the sending device may generate and/or transmit a pre-message once every defined frequency period, such as, but not limited to, once every millisecond, ten milliseconds, 100 milliseconds, or the like. Alternatively or additionally, the sending device may generate and/or transmit a pre-message based on a trigger or triggering event. In an aspect, such a triggering event may include a user entering a character of data into the message, such as by pressing a letter, number, or space key, or by entering data into the communication message by any other means. Furthermore, such a triggering event may include a user deleting or otherwise erasing data from an in-progress communication message, such as, but not limited to, pressing a backspace or delete key on a keyboard or by otherwise erasing or deleting such data.

In an aspect, first computer device 102 may transmit messages 116 to a network 110 via a communication link 122, which may be a direct wired or wireless communication link. In such an aspect, for example, first computer device 102 may be a desktop computer or other device that may directly communicate with network 110. Thereafter, network 110 may determine a destination computer device for messages 116, which may be second computer device 104, and may transmit messages 120—which may be the transmitted messages 116 or a message substantially similar thereto after any network processing—to second computer device 104. Similar to first computer device 102, second computer device 104 may communicate with network 110 via communication link 124, which may be a direct wired or wireless communication link.

Alternatively or additionally, first computer device 102 may transmit messages 116 to a first network entity 106 via a wired or wireless, e.g. over-the-air, connection 114. First network entity 106 may receive messages 116 and may forward such messages 116 to network 110 via communication link 122, which in this case may exist between first network entity 106 and network 110. Furthermore, when forwarding messages 116 to second computer device 104, network 110 may transmit the messages 120 via communication link 124 to the second network entity 108, which may then forward the messages 120 to second computer device 104 via a wired or wireless connection 118 between the second network entity 108 and the second computer device 104.

In such an example, first network entity 102 and/or second network entity 104 may include one or more of any type of component capable of providing access to network 110, such as an access point, including a base station (BS) or Node B, a mobile or cellular phone, a relay, a peer-to-peer device, a radio network controller (RNC), an authentication, authorization and accounting (AAA) server, a mobile switching center (MSC), etc., that can enable a computer device (e.g. first computer device 102 and/or second computer device 104) to communicate and/or that can establish and maintain a communication link with network 110, such as communication links 122 and 124. In an example communication system 100 utilizing at least one over-the-air connection, first and/or second computer devices 102 and 104 may be any device capable of communicating over-the-air, such as, but not limited to, a mobile or cellular phone, a smart phone, tablet computer, laptop computer, pager, mobile device, user equipment (UE) and/or any communication device capable of messaging another computer device. In an additional aspect, first computer device 102 and/or second computer device 104 may include a messaging manager 112, which may be configured to generate, transmit, receive, process, store, and/or manipulate one or more messages during a messaging session.

In an additional aspect, first computer device 102 and second computer device 104 may optionally communicate via a peer-to-peer (P2P) connection 130. In such an aspect, messages 116 and/or 120 (including pre-messages) or any other communications such as communication- or connection-establishing messages or signals, may be communicated directly between first computer device 102 and second computer device 104 and, in some examples, may do so without the aid of an intermediate network or network entity (e.g. network 110, network entities, Internet, etc.). Additionally, first computer device 102 and second computer device 104 may optionally communicate via push-to-talk (PTT) communication, such as Push-to-Talk-over-Cellular (PoC) communication. In a further aspect, first computer device 102 and second computer device 104 may optionally communicate via broadcast or multicast. For example, in an aspect, rather than establishing a one-to-one communication channel between a sending device and receiving device, a sending device may transmit one of a pre-message or completed message via a broadcast, multicast communication, or any other one-to-many communication transmission technique, which may be received by one or more receiving devices able to receive such messages.

Furthermore, for purposes of the present disclosure, the term "computer device" (e.g. as in first computer device 102 and/or second computer device 104) may refer to any device capable of electronic communication. Such a computer device may include, but is not limited to, a desktop computer, laptop computer, tablet computer, mobile telephone or mobile device, smart phone, and/or an e-reader.

Figure 2:
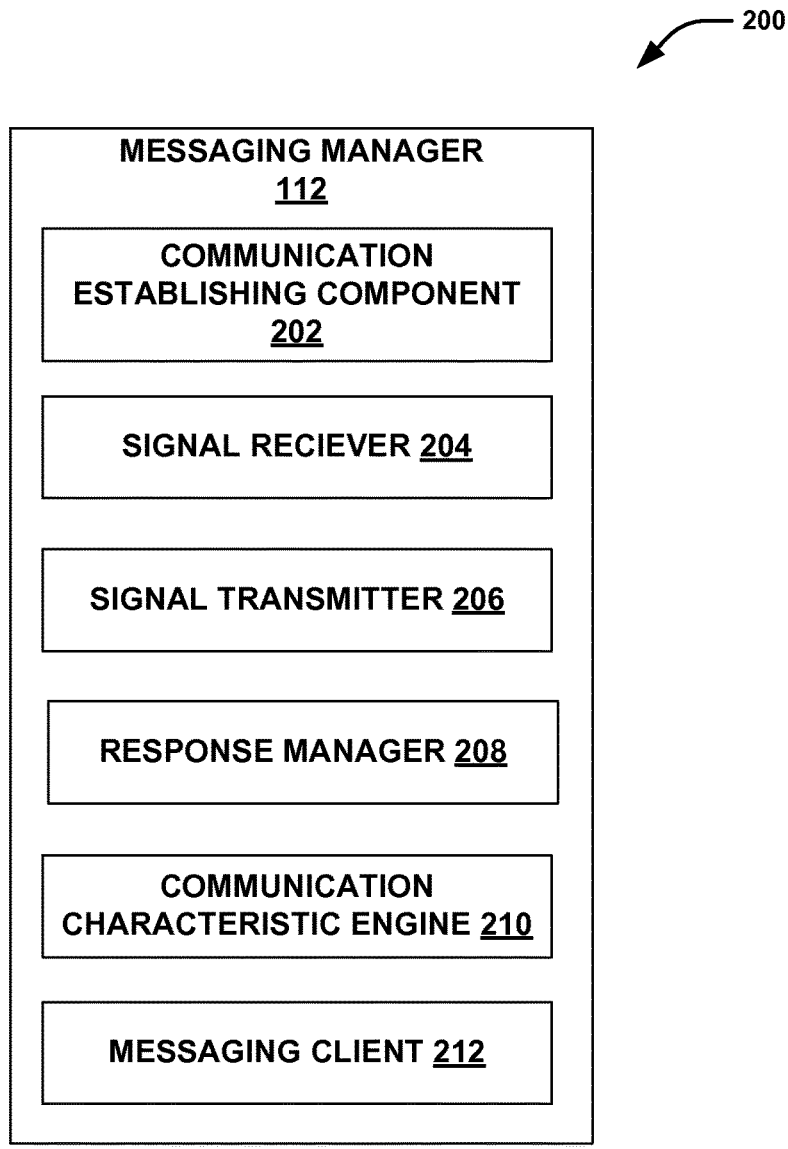
FIG. 2 is a component block diagram illustrating aspects of a messaging manager according to one or more aspects of the present disclosure.

Turning to FIG. 2, aspects of messaging manager 112 (FIG. 1) are illustrated, which allow for improved messaging between computer devices. In an aspect, messaging manager 112 may contain a communication establishing component 202, which may be configured to establish one or more communicative connections with one or more other computer devices with which a computer device may engage in a messaging session. For example, communication establishing component may engage in handshake and/or connection establishment procedures with the other computer device and/or intermediate entities that facilitate establishment and maintenance of a communication session during which messages may be exchanged. Such intermediate entities may include network access entities (e.g. a base station, a Node B, a peer device, a mobile device, a router, a server, or any other network device).

Additionally, in an aspect, messaging manager 112 may include a signal receiver 204 and/or a signal transmitter 206, which may be configured to respectively send and receive messages to other devices (e.g. another computer device with which the computer device is communicating or any intermediate network device). In an aspect, signal receiver 204 may include a receiver, antenna, or transceiver and corresponding received signal processing components, and signal transmitter 206 may include a transmitter, antenna, or transceiver and corresponding transmitted signal processing components.

Additionally, in an aspect, messaging manager 112 may include a response manager 208, which may be configured to generate and initiate a local output, such as via a user interface on the receiving computer device, in response to one or more received messages, which may be pre-messages or the completed communication messages themselves. For example, where messaging manager 112 receives a pre-message from another computer device, response manager may determine whether the pre-message warrants generation of a local output response at the receiving device, such as a visual, auditory, or tactile response. Based on this determination, response manager 208 may further determine whether a user or messaging client has configured the computer device to provide responses to pre-messages. In an aspect, where such local output responses are configured to occur, response manager 208 may generate one or more local output responses and signal other components in the computer device to carry out the one or more local output responses.

In a further aspect, response manager 208 may be configured to generate and initiate a local response at the receiving device before any communication messages have been received from the sending device. For example, where a sending device begins composing an initial message of a messaging session between the sending device and the receiving device, the receiving device may receive one or more pre-messages associated with the initial composition input though no communication message data has yet been received. In response to the receiving device receiving and/or processing the one or more pre-messages, response manager 208 may generate and initiate the local output. In a non-limiting example, response manager 208 may initiate the display of a chat window on a display device associated with the receiving device, or may otherwise initiate another type of response, such as, but not limited to, a auditory response and/or a tactile response.

Furthermore, messaging manager 112 may include a communication characteristic engine 210, which may be configured to generate one or more communication characteristic indicators, which may be transmitted as a pre-message to another computer device with which the communication device is communicating in a messaging session. As noted above, each communication characteristic indicator may define a speed, direction (e.g., typing or deleting), rate, inflection, pace, etc., of an in-progress input, e.g. a portion of a message that is in-process but not yet sent from a sending computer device. For example, where a user is typing a message at a rate higher than a threshold value, communication characteristic engine may generate a communication characteristic indicator that indicates to a receiving computer device that the sending user is typing faster than normal. In an alternative aspect, where a user begins composing a message and halts composition of the message for longer than a threshold period of time, communication characteristic engine 210 may generate a communication characteristic indicator that indicates to a receiving computer device that the sending user has paused. Based on these communication characteristic indicators, the receiving user may make inferences about an in-process message, e.g. an impending message that is being composed, which may allow the receiving user to remain fully informed regarding the circumstances of the message composition.

In an additional aspect, messaging manager 112 may include a messaging client 212, which may be configured to facilitate messaging functionality for a computer device (e.g. first and second computer devices 102 and 104 (FIG. 1)). In an aspect, messaging client 212 may store messaging protocols and specifications for communicating with other devices, may store instructions for providing a graphical user interface for messaging, driver or protocol information for outputting response signals to hardware components of the computer device, or any other instructions or protocols required for messaging operation in the computer device. Additionally, messaging client 212 may include one or more of an instant messaging client, text messaging client, paging client, email client, or any other client that allows exchange of textual, visual, auditory, or tactile data between computer devices.

Figure 3:
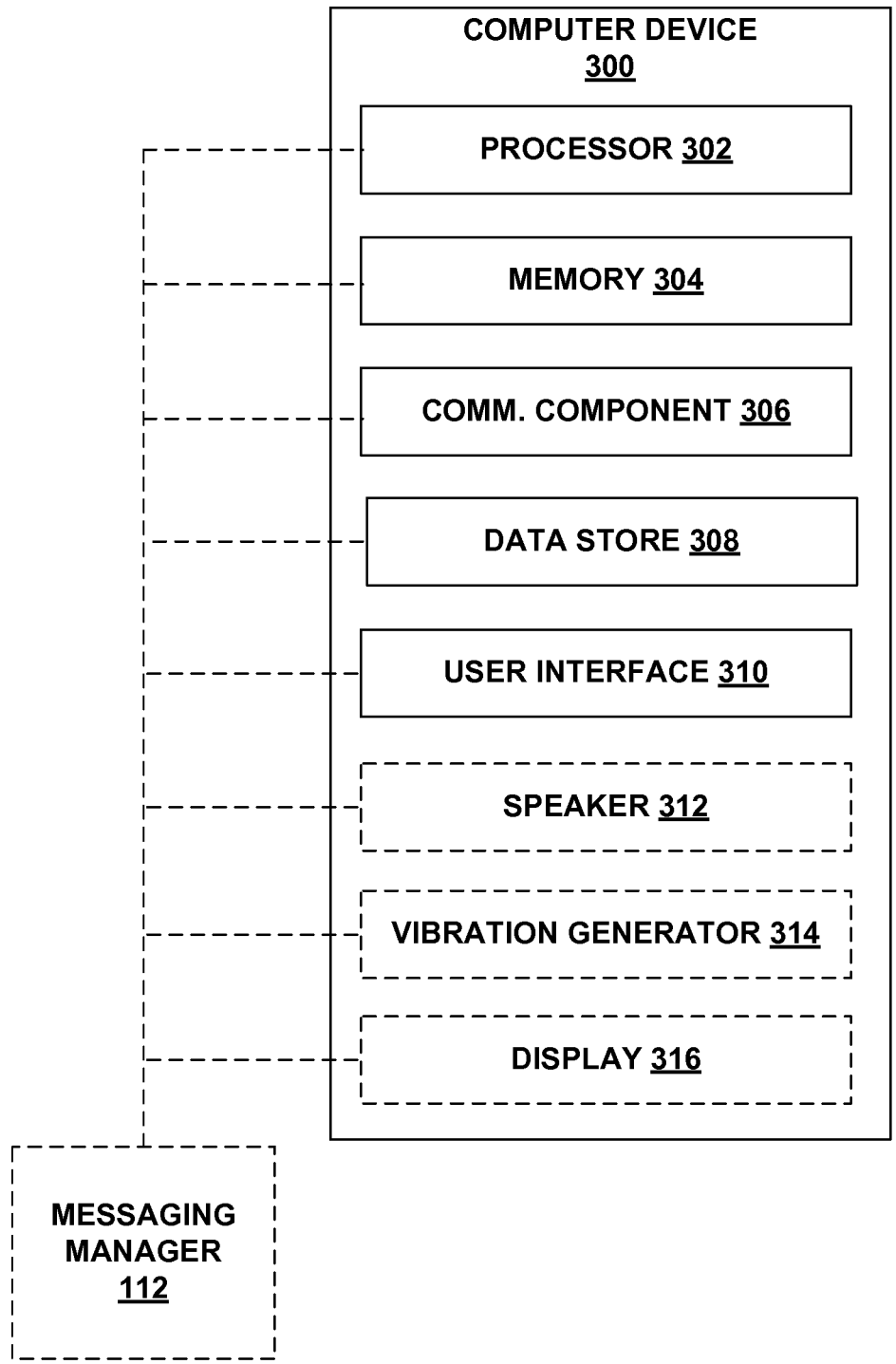
FIG. 3 is a computer device block diagram according to one or more aspects of the present disclosure.

Referring to FIG. 3, in one aspect, either of first computer device 102 and second computer device 104 (FIG. 1) may be represented by a specially programmed or configured computer device 300. Computer device 300 includes a processor 302 for carrying out processing functions associated with one or more of components and functions described herein. Processor 302 can include a single or multiple set of processors or multi-core processors. Moreover, processor 302 can be implemented as an integrated processing system and/or a distributed processing system.

Computer device 300 further includes a memory 304, such as for storing data used herein and/or local versions of applications being executed by processor 302. Memory 304 can include any type of memory usable by a computer, such as random access memory (RAM), read only memory (ROM), tapes, magnetic discs, optical discs, volatile memory, non-volatile memory, and any combination thereof.

Further, computer device 300 includes a communications component 306 that provides for establishing and maintaining communications with one or more parties utilizing hardware, software, and services as described herein. Communications component 306 may carry communications between components on computer device 300, as well as between computer device 300 and external devices, such as devices located across a communications network and/or devices serially or locally connected to computer device 300. For example, communications component 306 may include one or more buses, and may further include transmit chain components and receive chain components associated with a transmitter and receiver, respectively, or a transceiver, operable for interfacing with external devices.

Additionally, computer device 300 may further include a data store 308, which can be any suitable combination of hardware and/or software, that provides for mass storage of information, databases, and programs employed in connection with aspects described herein. For example, data store 308 may be a data repository for applications not currently being executed by processor 302.

Computer device 300 may additionally include a user interface 310 operable to receive inputs from a user of computer device 300, and further operable to generate outputs for presentation to the user. User interface 310 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 310 may include one or more output devices, including but not limited to a display, a speaker, a haptic feedback mechanism, a printer, any other mechanism capable of presenting an output to a user, or any combination thereof.

In an optional arrangement or aspect, computer device may include one or more hardware components configured to convey messaging indicators, e.g. communication characteristic indicators, to the user of a receiving computer device engaged in a messaging session. For example, computer device 300 may include a speaker 312, vibration generator 314, and/or display 316, which may be configured to provide auditory, tactile, and visual indications, respectively, to a user as a result of computer device receiving one or more messages and/or pre-messages from another computer device. It should be noted that speaker 312, vibration generator 314, and/or display 316 may be included in user interface 310.

Furthermore, in an implementation of first computer device 102 or second computer device 104 (FIG. 1), computer device 300 may include messaging manager 112 (FIGS. 1 and 2), such as in specially programmed computer readable instructions or code, firmware, hardware, or some combination thereof.

Figure 4:
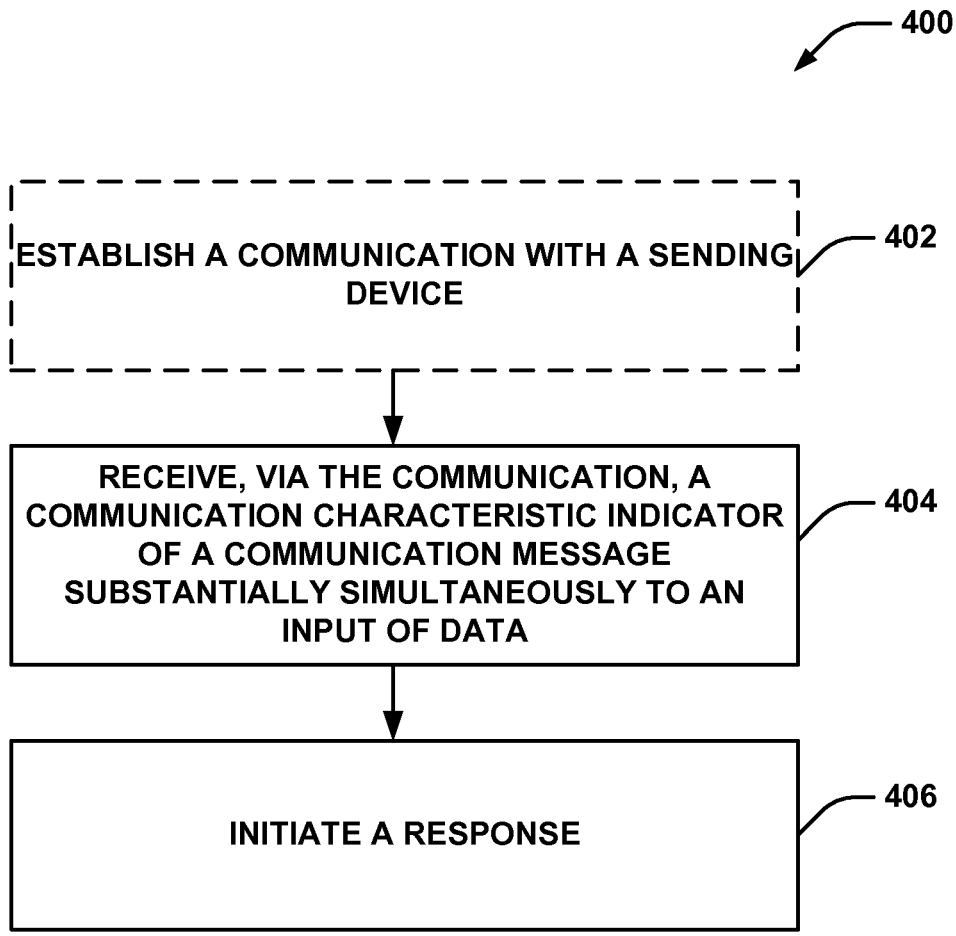
FIG. 4 is a flow diagram of an example methodology for improved messaging according to one or more aspects of the present disclosure.
Figure 5:
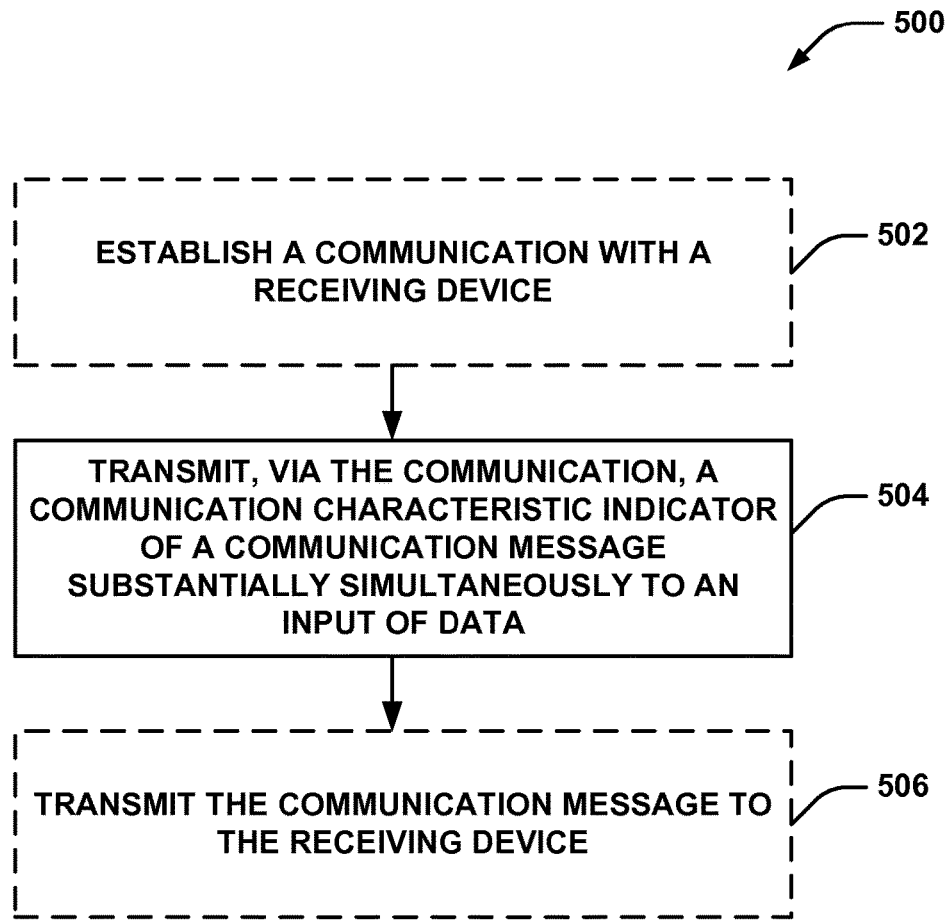
FIG. 5 is a flow diagram of an example methodology for improved messaging according to one or more aspects of the present disclosure.

Referring to FIGS. 4 and 5, respectively, example methodologies 400 and 500 are illustrated for providing optimized messaging functionality in a computer device. While, for purposes of simplicity of explanation, the methodologies are shown and described as a series of acts, it is to be understood and appreciated that the methodology is not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Turning to FIG. 4, an example methodology 400 that may be performed by a message or pre-message receiving computer device (e.g. first computer device 102 and/or second computer device 104 of FIG. 1) is provided. In an optional aspect, at block 402, a computer device, such as a receiving device, may establish a communication with a sending device to receive (and/or subsequently transmit) one or more messages or pre-messages during a messaging session. Where the communication has been established, at block 404, the receiving computer device may receive, via the communication, a communication characteristic indicator associated with a communication message. In an additional aspect, the communication characteristic indicator may be contained in one or more pre-messages intermittently received by the receiving device before receipt of a completed message transmitted from a sending computer device. Furthermore, in an aspect, the characteristic indicator may provide information about the message being composed—such as, but not limited to, the speed, corrections, inflection, pace, composition time, key typing accuracy, or any other characteristic of the message composition at the sending device.

In addition, based on receiving the communication characteristic indicator, at block 406, the receiving device may initiate or generate a response that may convey the communication characteristic to the user of the receiving device. For example, the response may be a local output on a user interface of the receiving device, such as a visual, auditory, tactile, or any combination thereof response. Further, for example, where a user of a sending device is typing at a high rate of speed, the receiving device may convey this to the user by mimicking the keystrokes of the sending computer device user through playing a "click, click, click" sound in unison with receiving the characteristic indicator from the sending device. Alternatively or additionally, the receiving computer device may mimic the input of the sending device by mimicking the keystrokes of the sending computer device user through vibrating the phone in unison with receiving the characteristic indicator from the sending device. Furthermore, where a computer device receives an indication that a message has been completed and/or received by the computer device, the computer device may provide a response that indicates that the completed message has been received. These and other responses will additionally be described in reference to FIGS. 6-8, below.

Turning to FIG. 5, an example methodology 500 that may be performed by a message or pre-message sending computer device (e.g. first computer device 102 and/or second computer device 104 of FIG. 1) is provided. In an optional aspect, at block 502, the sending device may establish a communication with a receiving device. Furthermore, at block 504, the sending device may generate and/or transmit, via the communication, a communication characteristic indicator of a communication message substantially simultaneously to an input of data by the sending device user. For example, in a non-limiting aspect, the communication characteristic indicator may be generated and/or transmitted (e.g., during a period where a transmitting device user is composing a communication message) at a high enough frequency such that, when received and a corresponding response is displayed by the receiving device, its user appears to be viewing a real-time, contemporaneous, substantially simultaneous representation of the state of the communication message being composed at the transmitting device. In some non-limiting examples, this frequency may be any value from approximately 20 MHz to approximately 1 Hz. Thus, in such examples, there may exist a time lag between the instant that the transmitting device user inputs an input (e.g. types a key) and the instant that a response corresponding to that input appears at the receiving device. In an aspect, this time lag may have a duration anywhere from approximately 50 nanoseconds to about a full second (which corresponds to the above non-limiting example frequency range of approximately 20 MHz to approximately 1 Hz). Additionally, as utilized in the present disclosure, any one or more of the terms "substantially simultaneous," "contemporaneous," and "mimicking" may correspond to a time lag duration of anywhere between zero seconds and five seconds, and in some examples, may correspond to the time lag duration in the above range of approximately 50 nanoseconds to about a full second.

Furthermore, in an optional aspect, at block 506, where the communication message is completed by the user of the sending device, the sending device may generate and transmit an indication that the message has been completed, such as a communication message completion indication message, which may prompt a response to the completion at the receiving device.

Figure 6A:
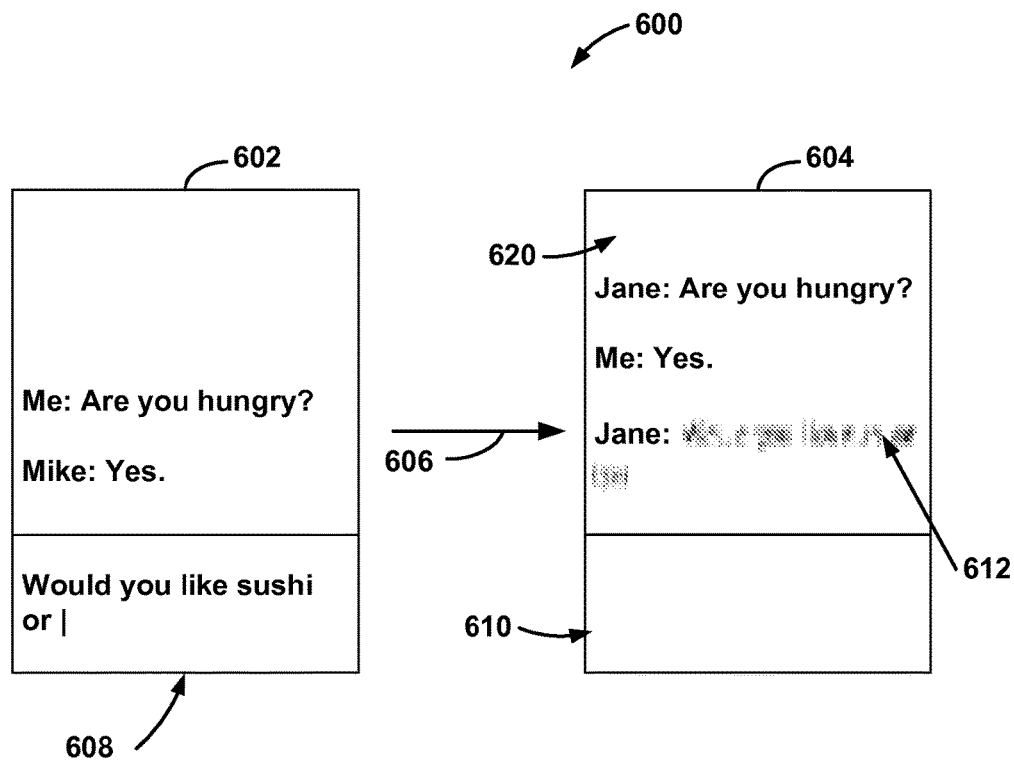
FIG. 6A is a graphical user interface illustration corresponding to a messaging session employing visual response to pre-messages and communication characteristic indicators according to one or more aspects of the present disclosure.

Turning to FIG. 6A, one aspect of a representation of a visual response at a receiving device is presented. In FIG. 6A, sending device graphical user interface (GUI) 602 and receiving device GUI 604 are presented in a messaging environment 600 during composition of a message. In an aspect, as a sending device user inputs a message into input window 608, the sending device may intermittently generate and transmit one or more messages 606, which may include pre-messages including one or more communication characteristic indicators. Upon receipt of the individual messages 606, the receiving device may generate a visual response 612 that mimics the current state of the message being input in sending device. As shown in FIG. 6A, this visual response 612 may appear blurred, or as being illegible or otherwise obfuscated, so as to not indicate the contents of the message, but may be clear enough to indicate any individual data input, deletion, input pause, or any other message characteristic of the message being composed in input window 608 of the sending device. In an exemplary aspect of the present disclosure, the visual response 612 may appear in a message history window 620 of GUI 604, which may enable the receiving device user to input a message into input window 610 substantially contemporaneously to the sending device user composing the message with which the visual response 612 is associated. In an alternative or additional aspect of FIG. 6A, the visual response 612 may appear in an input window 610 of receiving device GUI 604. Furthermore, message history window 620 and input window 610 may comprise a single window.

Figure 6B:
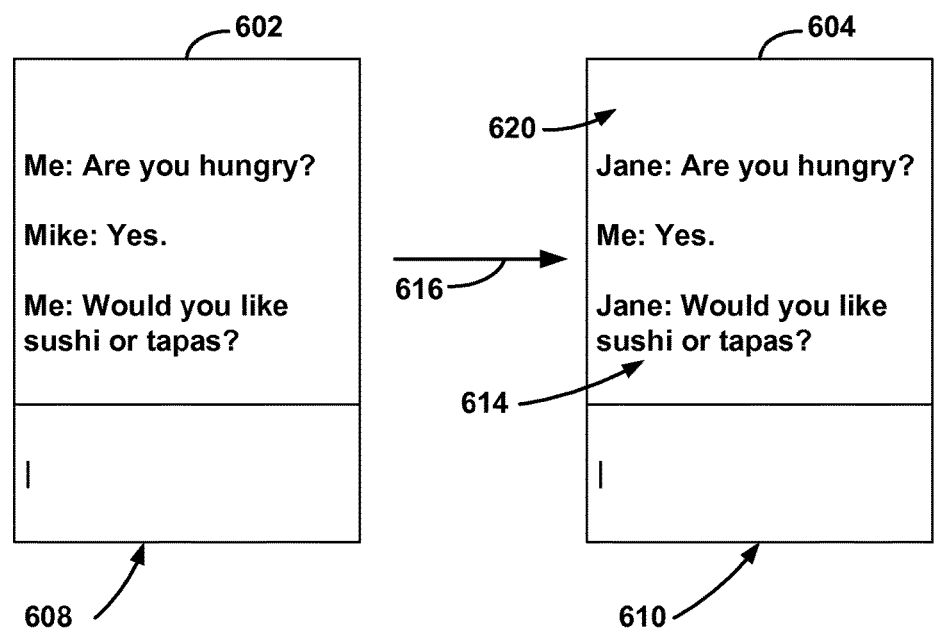
FIG. 6B is a graphical user interface illustration corresponding to a messaging session employing visual response to a completed message according to one or more aspects of the present disclosure.

Further, in FIG. 6B, the sending device user may complete the message by, for example, clicking a "send" button on sending device GUI 602 (not shown), or by pressing an enter key on a keyboard. In response to this completion indication, sending device may generate and transmit a completion message 616, which may include the completed message contents and/or a completed message indicator, to the receiving device. Upon receipt of the completion message 616, the completed message 614 may appear unblurred in the message history window 620 of the receiving device GUI 604, and the input window 610 of the receiving device GUI 604 may be cleared and prepared for input at an optional cursor.

Figure 7A:
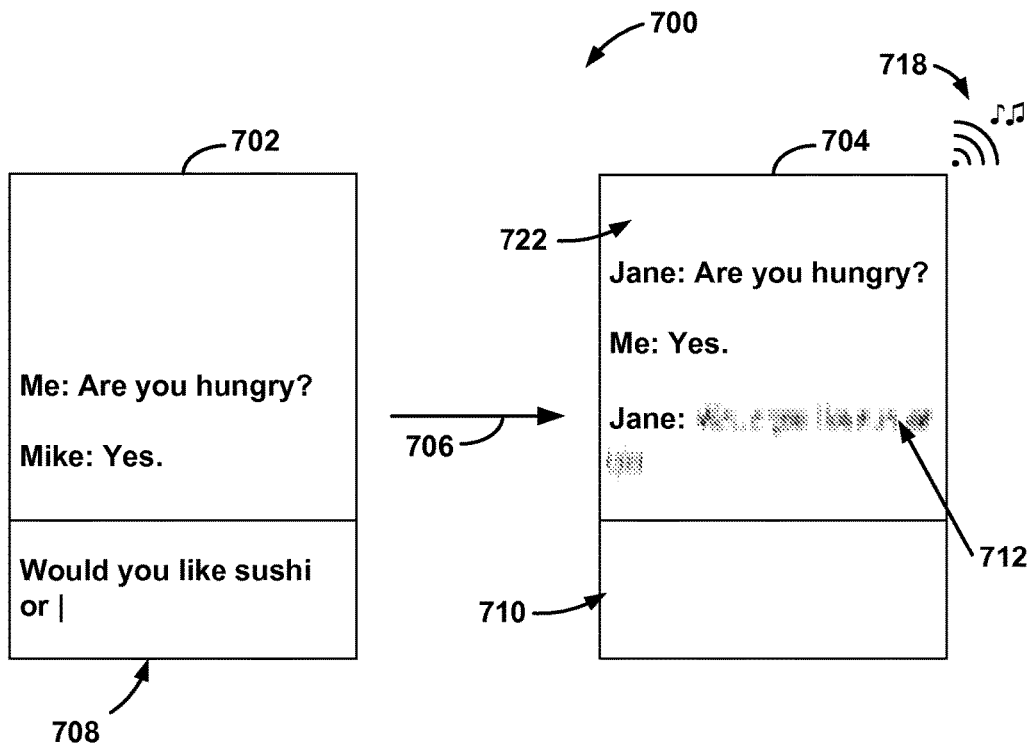
FIG. 7A is a graphical user interface illustration corresponding to a messaging session employing auditory response to pre-messages and communication characteristic indicators according to one or more aspects of the present disclosure.

Referencing FIG. 7A, a representation of an auditory response at a receiving device is presented. In FIG. 6A, sending device GUI 702 and receiving device GUI 704 are presented in a messaging environment 700 during composition of a message. In an aspect, as a sending device user inputs a message into input window 708, the sending device may intermittently generate and transmit one or more messages 706, which may include pre-messages including one or more communication characteristic indicators. Upon receipt of the individual messages 706, the receiving device may generate an auditory response 718, which may play a "click, click, click" sound, for example, to indicate the typing of the sending device user. Though the "click" sound is mentioned here as an example, any sound or combination of sounds may be played upon receipt of the communication characteristic indicator. These sounds may be configured by the user, and may be personalized for messaging with a particular user, for example. Furthermore, as in FIG. 6A, in an optional aspect, the receiving device may contemporaneously produce a visual response 712—in a message history window 722 or input window 710, for example—that mimics the current state of the message in sending device input window 708. Furthermore, message history window 722 and input window 710 may comprise a single window.

Figure 7B:
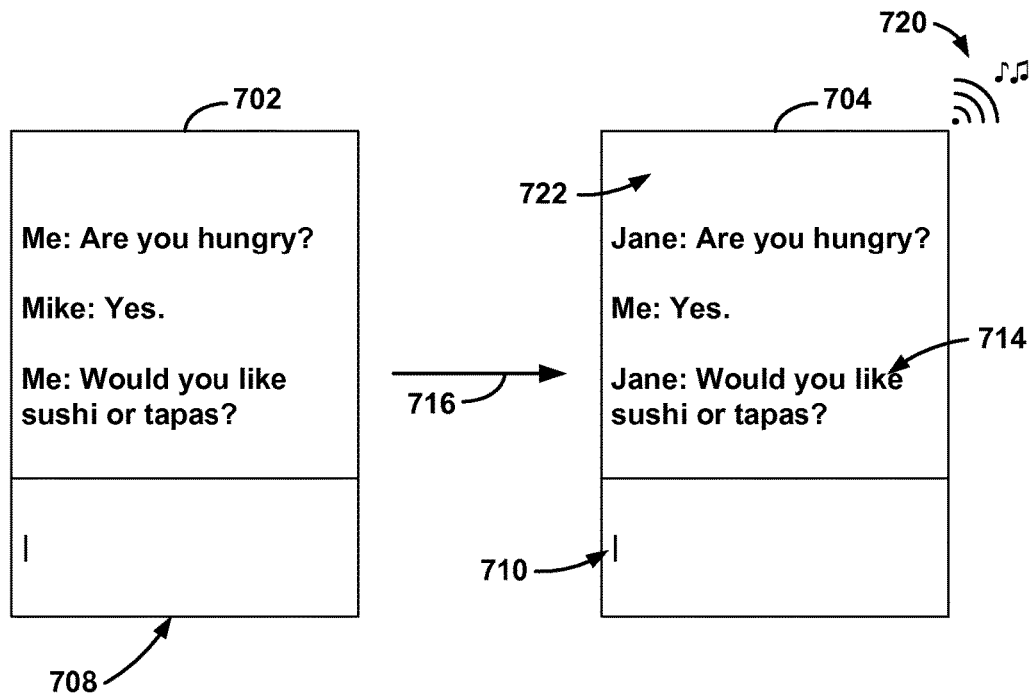
FIG. 7B is a graphical user interface illustration corresponding to a messaging session employing auditory response to a completed message according to one or more aspects of the present disclosure.

Further, in FIG. 7B, in response to receiving a completion indication, sending device may generate and transmit a completion message 716, which may include the completed message contents and/or a completed message indicator, to the receiving device. Upon receipt of the completion message 716, the receiving device may play a unique "message completed" sound 720, which may be the same or different than previous auditory response 718 played in response to a pre-message, and completed message 716 may appear unblurred in message history window 722 of the receiving device GUI 704, and the input window 710 of the receiving device GUI may be cleared and prepared for input.

Figure 8A:
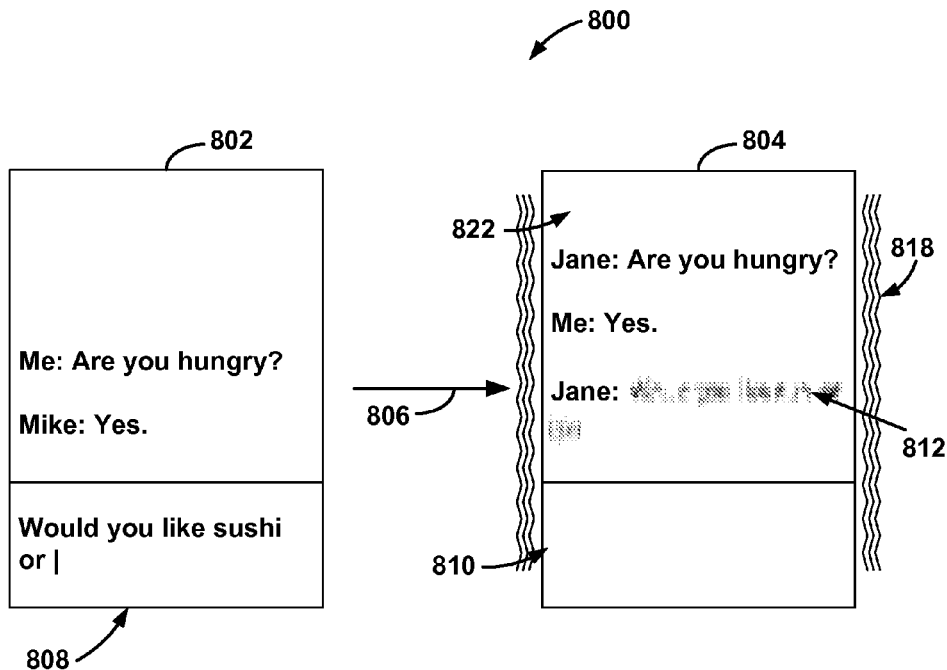
FIG. 8A is a graphical user interface illustration corresponding to a messaging session employing tactile response to pre-messages and communication characteristic indicators according to one or more aspects of the present disclosure.

Referencing FIG. 8A, a representation of a tactile response at a receiving device is presented. In FIG. 8A, sending device GUI 802 and receiving device GUI 804 are presented in a messaging environment 800 during composition of a message. In an aspect, as a sending device user inputs a message into input window 808, the sending device may intermittently generate and transmit one or more messages 806, which may include pre-messages including one or more communication characteristic indicators. Upon receipt of the individual messages 806, the receiving device may generate a tactile response 818, which may vibrate the receiving device (e.g. a cell phone), for example, to indicate the typing of the sending device user. Furthermore, as in FIG. 6A, in an optional aspect, the receiving device may contemporaneously produce a visual response 812—in a message history window 822 or input window 810, for example—that mimics the current state of the message in sending device input window 808. Furthermore, message history window 822 and input window 810 may comprise a single window.

Figure 8B:
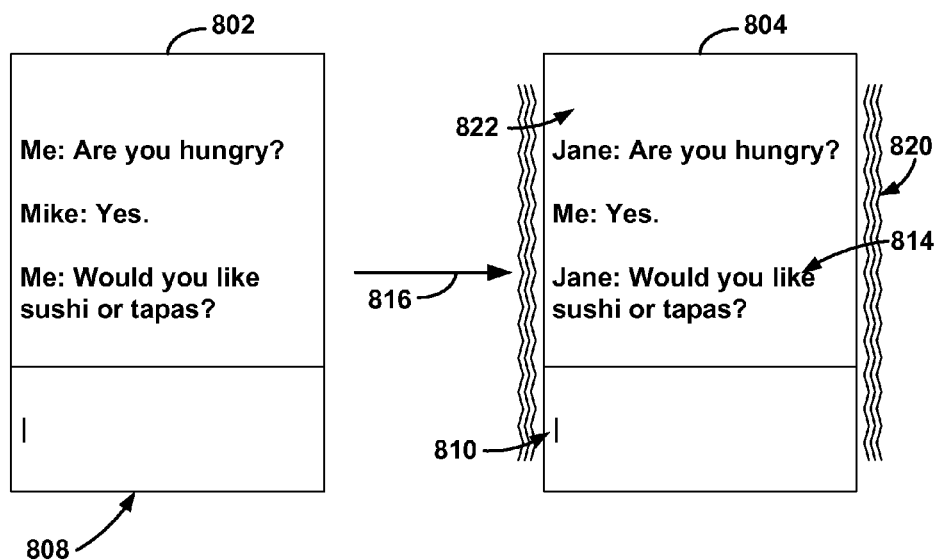
FIG. 8B is a graphical user interface illustration corresponding to a messaging session employing tactile response to a completed message according to one or more aspects of the present disclosure.

Further, in FIG. 8B, in response to receiving a completion indication, sending device may generate and transmit a completion message 816, which may include the completed message contents and/or a completed message indicator, to the receiving device. Upon receipt of the completion message 816, the receiving device may produce a message completed tactile response 820, which may be the same or different from previous tactile response 818 produced in response to a pre-message. Additionally, completed message 814 may appear unblurred in the message history window 822 of the receiving device GUI 804, and the input window 810 of the receiving device GUI may be cleared and prepared for input.

Figure 9:
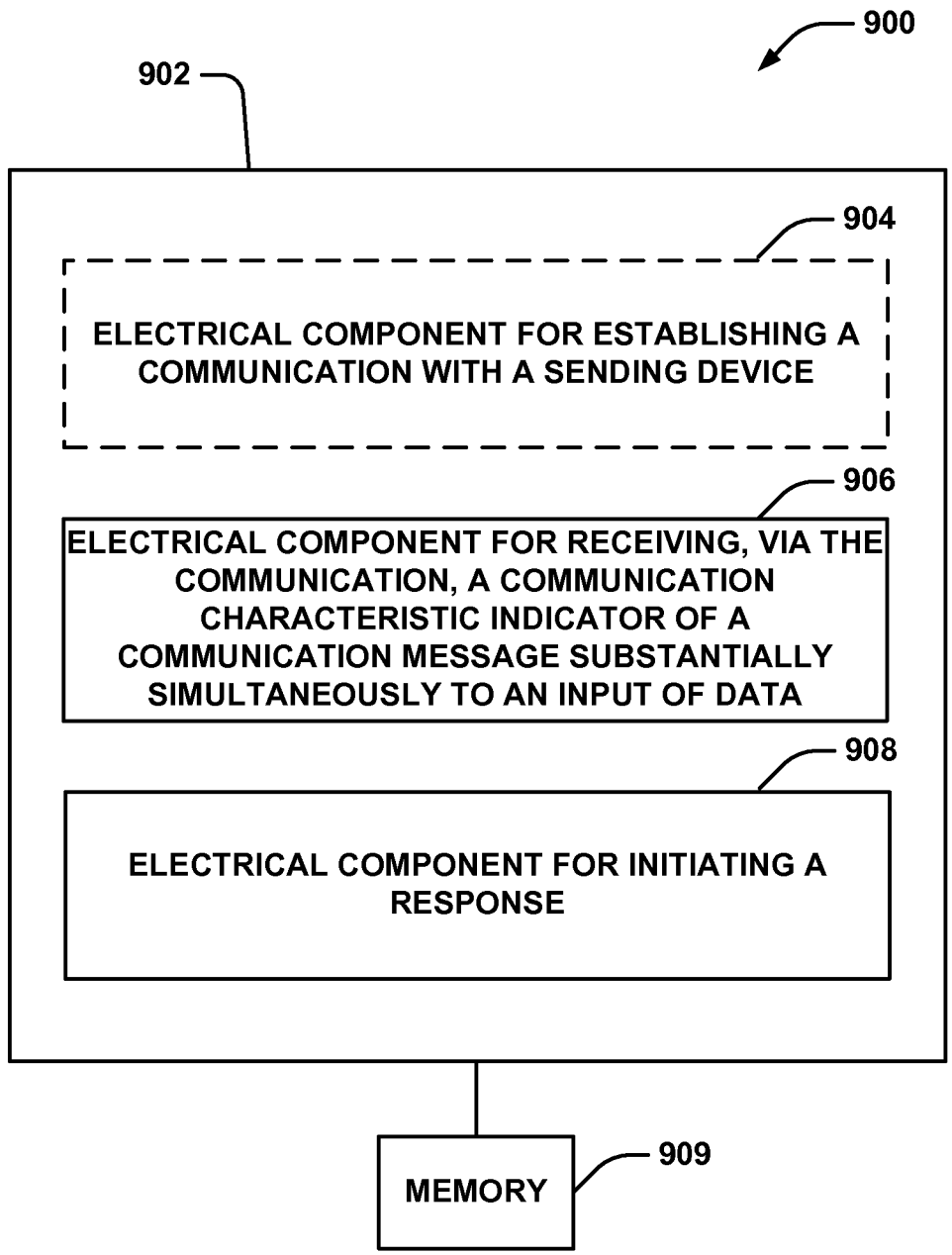
FIG. 9 is an electrical component diagram according to one or more aspects of the present disclosure.

Referring to FIG. 9, an example system 900 is displayed for optimizing candidate cell scanning in wireless environments. For example, system 900 can reside at least partially within one or more network entities. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an optional electrical component 904 for establishing a communication with a sending device. In an aspect, electrical component 904 may comprise communication establishing component 202 (FIG. 2). In an additional aspect, logical grouping 902 can include an electrical component 906 for receiving, via the communication, a communication characteristic indicator if a communication message substantially simultaneously to an input of data at the sending device. In an aspect, electrical component 906 may comprise signal receiver 204 (FIG. 2). In an additional aspect, logical grouping 902 can include an electrical component 908 for initiating a response at the receiving device. In an aspect, electrical component 908 may comprise response manager 208 (FIG. 2).

Additionally, system 900 can include a memory 909 that retains instructions for executing functions associated with the electrical components 904, 906, and 908, stores data used or obtained by the electrical components 904, 906, and 908, etc. While shown as being external to memory 909, it is to be understood that one or more of the electrical components 904, 906, and 908 can exist within memory 909. In one example, electrical components 904, 906, and 908 can comprise at least one processor, or each electrical component 904, 906, and 908 can be a corresponding module of at least one processor. Moreover, in an additional or alternative example, electrical components 904, 906, and 908 can be a computer program product including a computer readable medium, where each electrical component 904, 906, and 908 can be corresponding code.

Figure 10:
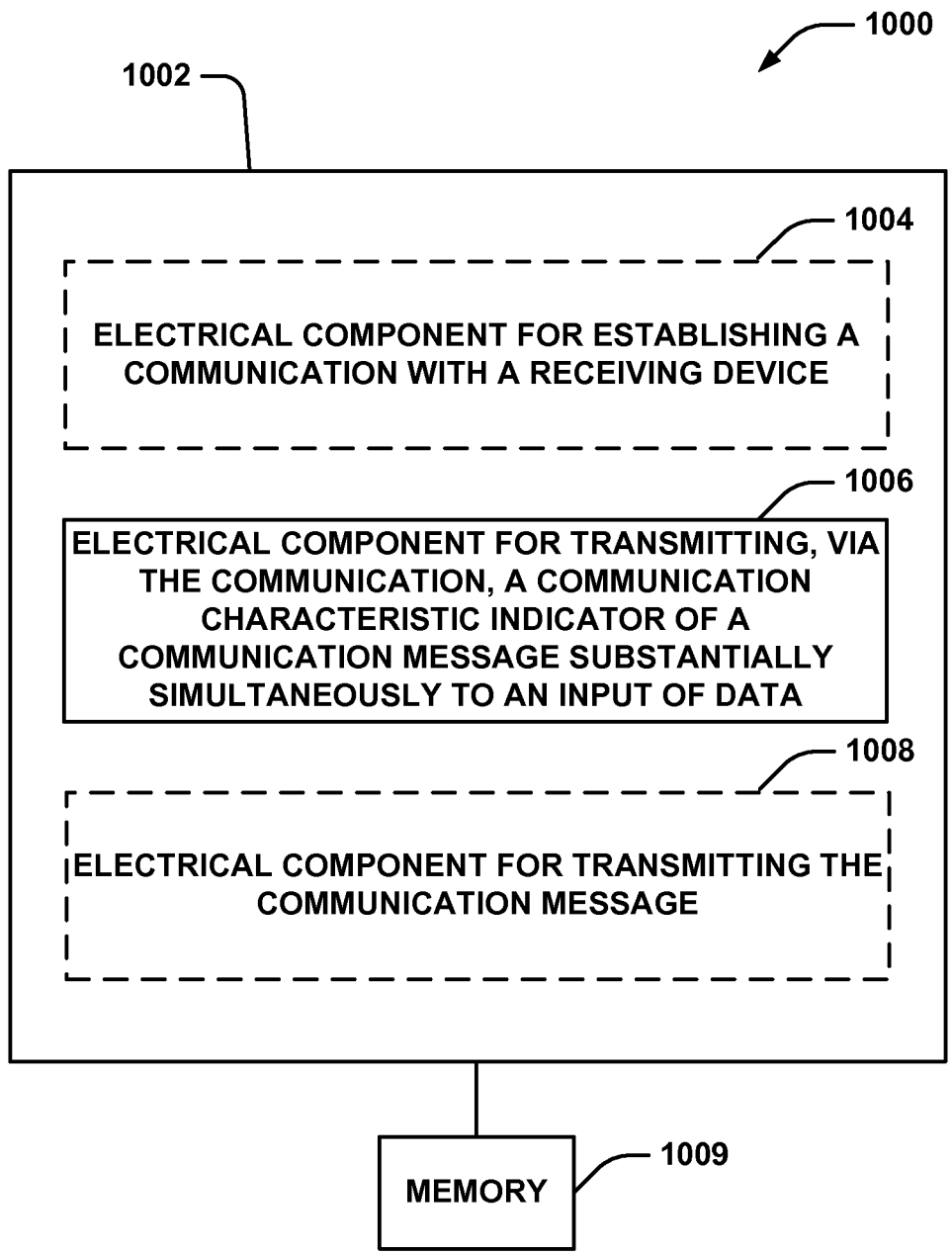
FIG. 10 is an electrical component diagram according to one or more aspects of the present disclosure.

Referring to FIG. 10, an example system 1000 is displayed for optimizing candidate cell scanning in wireless environments. For example, system 1000 can reside at least partially within one or more network entities. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an optional electrical component 1004 for establishing a communication with a sending device. In an aspect, electrical component 1004 may comprise communication establishing component 202 (FIG. 2). In an additional aspect, logical grouping 1002 can include an electrical component 1006 for transmitting, via the communication, a communication characteristic indicator of a communication message substantially simultaneously to an input of data at the sending device. In an aspect, electrical component 1006 may comprise signal transmitter 206 (FIG. 2). Furthermore, logical grouping 1002 can include an optional electrical component 1008 for transmitting the communication message. In an aspect, electrical component 1008 may comprise signal transmitter 206 (FIG. 2).

Additionally, system 1000 can include a memory 1009 that retains instructions for executing functions associated with the electrical components 1004 and 1006, stores data used or obtained by the electrical components 1004 and 1006, etc. While shown as being external to memory 1009, it is to be understood that one or more of the electrical components 1004 and 1006 can exist within memory 1009. In one example, electrical components 1004 and 1006 can comprise at least one processor, or each electrical component 1004 and 1006 can be a corresponding module of at least one processor. Moreover, in an additional or alternative example, electrical components 1004 and 1006 can be a computer program product including a computer readable medium, where each electrical component 1004 and 1006 can be corresponding code.

Figure 11:
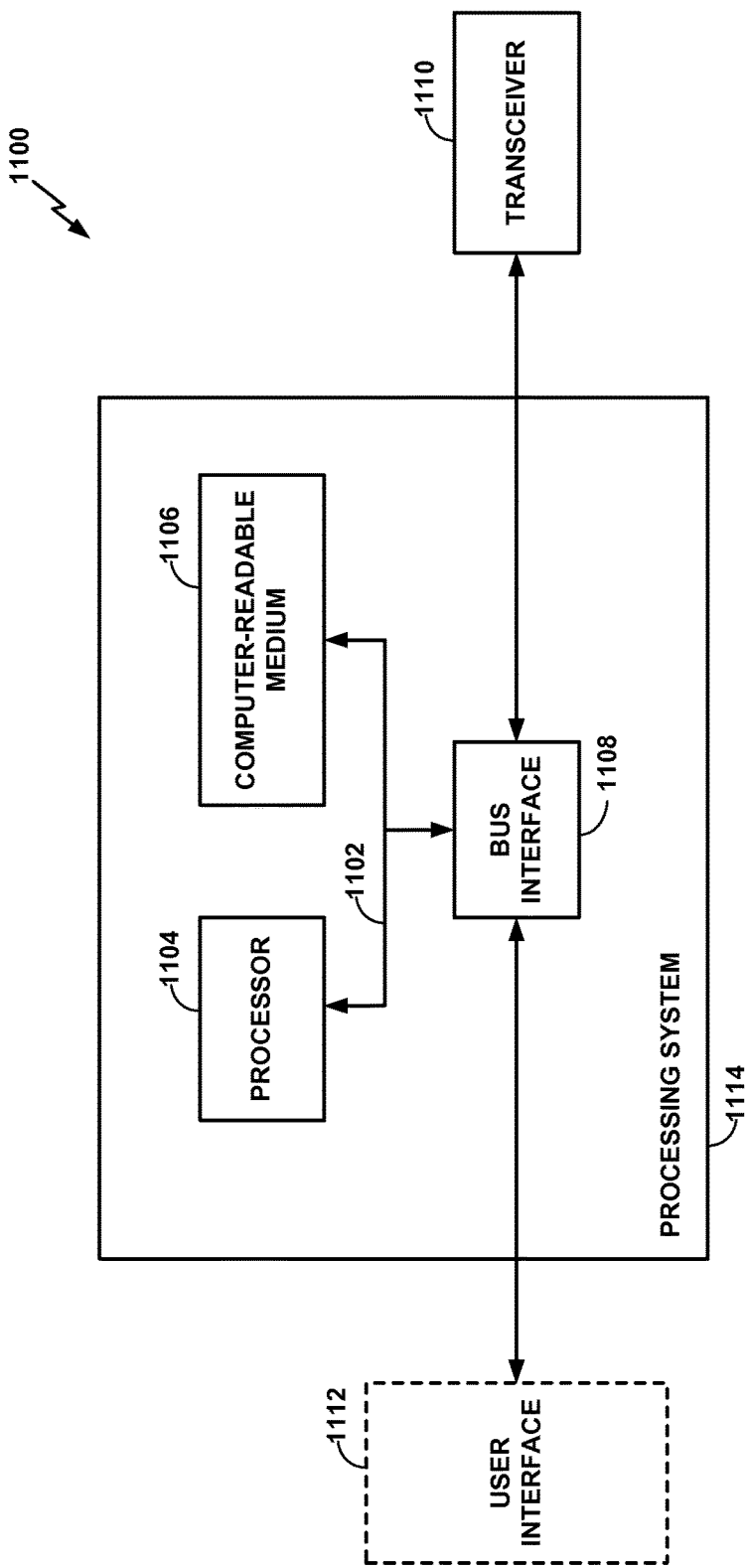
FIG. 11 is a block diagram illustrating an example of a hardware implementation for an apparatus employing a processing system.

In addition, FIG. 11 is a block diagram illustrating an example of a hardware implementation for an apparatus 1100 employing a processing system 1114. In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors, represented generally by the processor 1104, and computer-readable media, represented generally by the computer-readable medium 1106. The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, joystick) may also be provided.

The processor 1104 is responsible for managing the bus 1102 and general processing, including the execution of software stored on the computer-readable medium 1106. The software, when executed by the processor 1104, causes the processing system 1114 to perform the various functions described infra for any particular apparatus. The computer-readable medium 1106 may also be used for storing data that is manipulated by the processor 1104 when executing software. Furthermore, the apparatus of FIG. 11 may be one or both of first computer device 102 and second computer device 104 (FIG. 1), and may be configured to provide improved messaging through use of pre-messaging according to aspects of the present disclosure.

Figure 12:
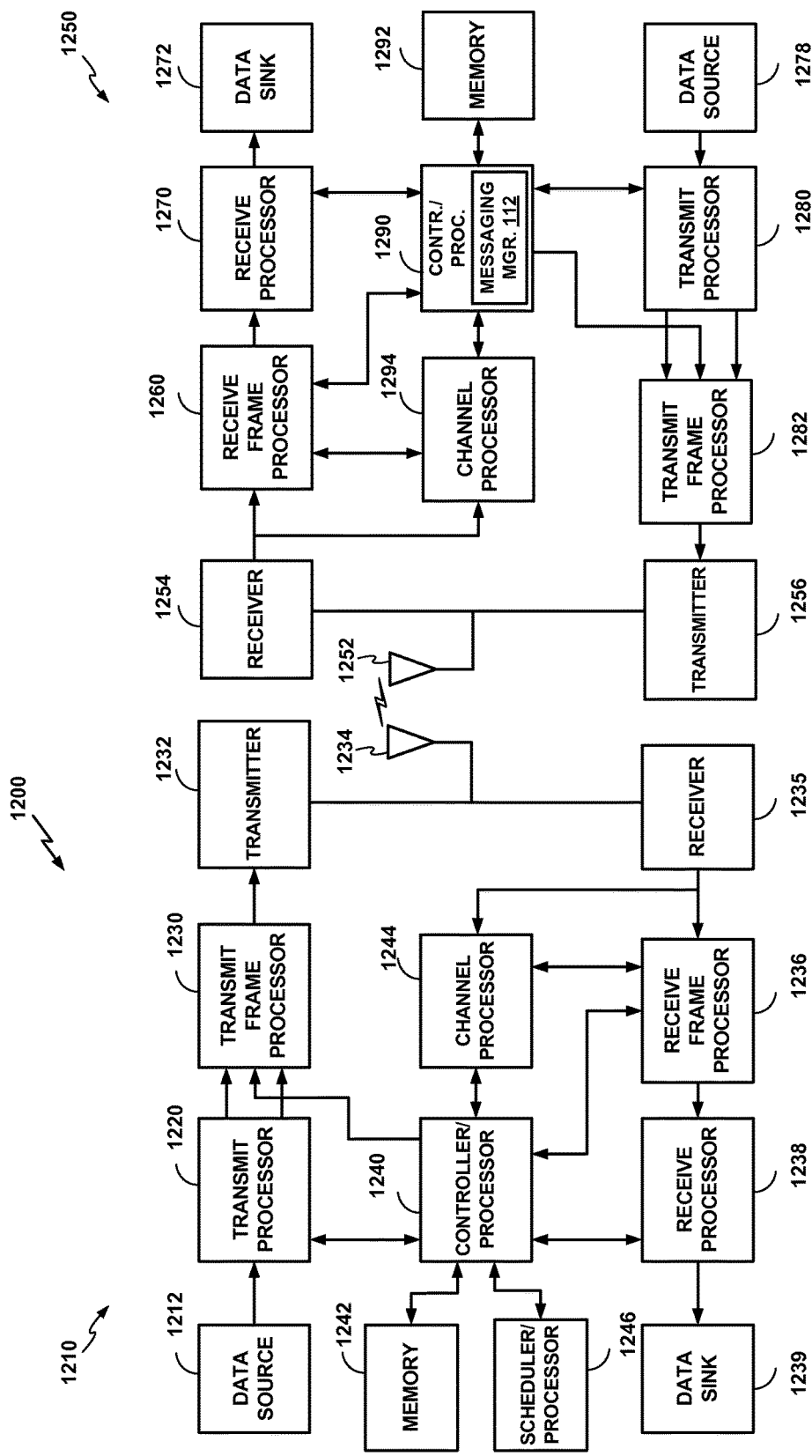
FIG. 12 is a block diagram conceptually illustrating an example of a Node B in communication with a UE in a telecommunications system.

FIG. 12 is a block diagram of a wireless aspect of the present disclosure, wherein Node B 1210 is in communication with a user equipment (UE) 1250, where the Node B 1210 may be first network entity 106 and/or second network entity 108 (FIG. 1), and the UE 1250 may be first computer device 102 and/or second computer device 104 (FIG. 1). In the downlink communication, a transmit processor 1220 may receive data from a data source 1212 and control signals from a controller/processor 1240. The transmit processor 1220 provides various signal processing functions for the data and control signals, as well as reference signals (e.g., pilot signals). For example, the transmit processor 1220 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1244 may be used by a controller/processor 1240 to determine the coding, modulation, spreading, and/or scrambling schemes for the transmit processor 1220. These channel estimates may be derived from a reference signal transmitted by the UE 1250 or from feedback from the UE 1250. The symbols generated by the transmit processor 1220 are provided to a transmit frame processor 1230 to create a frame structure. The transmit frame processor 1230 creates this frame structure by multiplexing the symbols with information from the controller/processor 1240, resulting in a series of frames. The frames are then provided to a transmitter 1232, which provides various signal conditioning functions including amplifying, filtering, and modulating the frames onto a carrier for downlink transmission over the wireless medium through antenna 1234. The antenna 1234 may include one or more antennas, for example, including beam steering bidirectional adaptive antenna arrays or other similar beam technologies.

At the UE 1250, a receiver 1254 receives the downlink transmission through an antenna 1252 and processes the transmission to recover the information modulated onto the carrier. The information recovered by the receiver 1254 is provided to a receive frame processor 1260, which parses each frame, and provides information from the frames to a channel processor 1294 and the data, control, and reference signals to a receive processor 1270. The receive processor 1270 then performs the inverse of the processing performed by the transmit processor 1220 in the Node B 1210. More specifically, the receive processor 1270 descrambles and despreads the symbols, and then determines the most likely signal constellation points transmitted by the Node B 1210 based on the modulation scheme. These soft decisions may be based on channel estimates computed by the channel processor 1294. The soft decisions are then decoded and deinterleaved to recover the data, control, and reference signals. The CRC codes are then checked to determine whether the frames were successfully decoded. The data carried by the successfully decoded frames will then be provided to a data sink 1272, which represents applications running in the UE 1250 and/or various user interfaces (e.g., display). Control signals carried by successfully decoded frames will be provided to a controller/processor 1290. When frames are unsuccessfully decoded by the receiver processor 1270, the controller/processor 1290 may also use an acknowledgement (ACK) and/or negative acknowledgement (NACK) protocol to support retransmission requests for those frames.

In the uplink, data from a data source 1278 and control signals from the controller/processor 1290 are provided to a transmit processor 1280. The data source 1278 may represent applications running in the UE 1250 and various user interfaces (e.g., keyboard). Similar to the functionality described in connection with the downlink transmission by the Node B 1210, the transmit processor 1280 provides various signal processing functions including CRC codes, coding and interleaving to facilitate FEC, mapping to signal constellations, spreading with OVSFs, and scrambling to produce a series of symbols. Channel estimates, derived by the channel processor 1294 from a reference signal transmitted by the Node B 1210 or from feedback contained in the midamble transmitted by the Node B 1210, may be used to select the appropriate coding, modulation, spreading, and/or scrambling schemes. The symbols produced by the transmit processor 1280 will be provided to a transmit frame processor 1282 to create a frame structure. The transmit frame processor 1282 creates this frame structure by multiplexing the symbols with information from the controller/processor 1290, resulting in a series of frames. The frames are then provided to a transmitter 1256, which provides various signal conditioning functions including amplification, filtering, and modulating the frames onto a carrier for uplink transmission over the wireless medium through the antenna 1252.

The uplink transmission is processed at the Node B 1210 in a manner similar to that described in connection with the receiver function at the UE 1250. A receiver 1235 receives the uplink transmission through the antenna 1234 and processes the transmission to recover the information modulated onto the carrier. The information recovered by the receiver 1235 is provided to a receive frame processor 1236, which parses each frame, and provides information from the frames to the channel processor 1244 and the data, control, and reference signals to a receive processor 1238. The receive processor 1238 performs the inverse of the processing performed by the transmit processor 1280 in the UE 1250. The data and control signals carried by the successfully decoded frames may then be provided to a data sink 1239 and the controller/processor, respectively. If some of the frames were unsuccessfully decoded by the receive processor, the controller/processor 1240 may also use an acknowledgement (ACK) and/or negative acknowledgement (NACK) protocol to support retransmission requests for those frames.

The controller/processors 1240 and 1290 may be used to direct the operation at the Node B 1210 and the UE 1250, respectively. For example, the controller/processors 1240 and 1290 may provide various functions including timing, peripheral interfaces, voltage regulation, power management, and other control functions. Furthermore, controller/processor 1290 of UE 1250 may include a messaging manager 112, which may be configured to generate, process, route, transmit, and/or receive one or more pre-messages or messages comprising a messaging session between UE 1250 and another device. In an aspect, messaging manager 112 may comprise messaging manager 112 of any of FIGS. 1-3 and UE 1250 may comprise first computer device 102 and/or second computer device 104 (FIG. 1). The computer readable media of memories 1242 and 1292 may store data and software for the Node B 1210 and the UE 1250, respectively. A scheduler/processor 1246 at the Node B 1210 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of operations in the methods disclosed is an illustration of exemplary processes. Based upon design preferences, it is understood that the specific order or hierarchy of operations in the methods may be rearranged. The accompanying method claims present elements of the various operations in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Furthermore, in the subject disclosure, the word "exemplary" is herein used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A computer-implemented method of electronic communication, comprising:
    receiving, at a receiving device over a network using one or more processors, one or more communication characteristic indicators of message content from an in-progress version of a communication message at a sending device;
    outputting, at the receiving device before completion of the communication message at the sending device, a representation of the message content from the in-progress version of the communication message based on the one or more communication characteristic indicators, wherein the representation of the message content includes a visual representation of the message content of the in-progress version of the communication message entered at the sending device,
    wherein—the visual representation of the message content of the in-progress version of the communication message occupies, within a display screen, an amount of screen area that is based on an amount of the message content included in the in-progress version of the communication message being entered at the sending device, and
    wherein the outputting of the visual representation of the message content from the in-progress version of the communication message is performed such that the message content from the in-progress version of the communication message cannot be perceived; and
    outputting, if a completed version of the communication message is received from the sending device at the receiving device, message content from the completed version of the communication message such that the message content from the completed version of the communication message can be perceived.

2. The computer-implemented method of claim 1, further comprising establishing, via the one or more processors, a communication with the sending device, wherein the one or more communication characteristic indicators are received via the communication.

3. The computer-implemented method of claim 1, wherein the visual representation comprises an obfuscated representation of the message content.

4. The computer-implemented method of claim 1, wherein the visual representation comprises an illegible representation of the message content.

5. The computer-implemented method of claim 1, wherein the completed version of the communication message is received from the sending device subsequent to receiving the one or more communication characteristic indicators.

6. The computer-implemented method of claim 1, wherein the representation of the message content further includes an auditory representation of the message content, and/or a tactile representation of the message content.

7. The computer-implemented method of claim 1, further comprising initiating, using the one or more processors, a graphical user interface on a user interface in response to receiving the one or more communication characteristic indicators.

8. The computer-implemented method of claim 1, further comprising receiving, using the one or more processors, the one or more communication characteristic indicators from a network entity.

9. The computer-implemented method of claim 1, further comprising receiving, using the one or more processors, the communication message from a network entity.

10. An apparatus including one or more electrical components configured to communicate electronically, comprising:
    a memory; and
    a processor circuit configured to:
    receive, over a network, one or more communication characteristic indicators of message content from an in-progress version of a communication message at a sending device;
    output, before completion of the communication message at the sending device, a representation of the message content from the in-progress version of the communication message based on the one or more communication characteristic indicators, wherein the representation of the message content includes a visual representation of the message content of the in-progress version of the communication message entered at the sending device,
    wherein the visual representation of the message content of the in-progress version of the communication message occupies, within a display screen, an amount of screen area that is based on an amount of the message content included in the in-progress version of the communication message being entered at the sending device, and
    wherein the output of the visual representation of the message content from the in-progress version of the communication message is performed such that the message content from the in-progress version of the communication message cannot be perceived; and
    output, if a completed version of the communication message is received from the sending device at the apparatus, message content from the completed version of the communication message such that the message content from the completed version of the communication message can be perceived.

11. A non-transitory computer-readable medium comprising:
    at least one instruction for causing a computer to receive, over a network, one or more communication characteristic indicators of message content from an in-progress version of a communication message at a sending device;
    at least one instruction for causing the computer to output, at a receiving device before completion of the communication message at the sending device, a representation of the message content from the in-progress version of the communication message based on the one or more communication characteristic indicators, wherein the representation of the message content includes a visual representation of the message content of the in-progress version of the communication message entered at the sending device, wherein the visual representation of the message content of the in-progress version of the communication message occupies, within a display screen, an amount of screen area that is based on an amount of the message content included in the in-progress version of the communication message being entered at the sending device, and wherein the output of the visual representation of the message content from the in-progress version of the communication message is performed such that the message content from the in-progress version of the communication message cannot be perceived; and at least one instruction for causing the computer to output, if a completed version of the communication message is received from the sending device at the receiving device, message content from the completed version of the communication message such that the message content from the completed version of the communication message can be perceived.

12. An apparatus for electronic communication, comprising:

means for receiving, over a network, one or more communication characteristic indicators of message content from an in-progress version of a communication message at a sending device;

means for outputting, before completion of the communication message at the sending device, a representation of the message content from the in-progress version of the communication message based on the one or more communication characteristic indicators, wherein the representation of the message content includes a visual representation of the message content of the in-progress version of the communication message entered at the sending device, wherein the visual representation of the message content of the in-progress version of the communication message occupies, within a display screen, an amount of screen area that is based on an amount of the message content included in the in-progress version of the communication message being entered at the sending device, and wherein the means for outputting of the visual representation of the message content from the in-progress version of the communication message performs the output such that the message content from the in-progress version of the communication message cannot be perceived; and means for outputting, if a completed version of the communication message is received from the sending device at the receiving device, message content from the completed version of the communication message such that the message content from the completed version of the communication message can be perceived.

13. An apparatus comprising one or more electrical components for electronic communication, the apparatus further comprising:

a signal receiver circuit configured to receive, over a network, one or more communication characteristic indicators of message content from an in-progress version of a communication message at a sending device;

a processor circuit configured to execute a response manager that is configured to output, before completion of the communication message at the sending device, a representation of the—message content from the in-progress version of the communication message based on the one or more communication characteristic indicators, wherein the representation of the message content includes a visual representation of the message content of the in-progress version of the communication message entered at the sending device, wherein the visual representation of the message content of the in-progress version of the communication message occupies, within a display screen, an amount of screen area that is based on an amount of the message content included in the in-progress version of the communication message being entered at the sending device, and wherein the output of the visual representation of the message content from the in-progress version of the communication message is performed such that the message content from the in-progress version of the communication message cannot be perceived; and wherein the processor circuit is further configured to output, if a completed version of the communication message is received from the sending device at the apparatus, message content from the completed version of the communication message such that the message content from the completed version of the communication message can be perceived.

14. The apparatus of claim 13, further comprising a communication establishing component configured to establish a communication with the sending device, wherein the one or more communication characteristic indicators are received via the communication.

15. The apparatus of claim 13, wherein the visual representation comprises an obfuscated representation of the message content.

16. The apparatus of claim 13, wherein the visual representation comprises an illegible representation of the message content.

17. The apparatus of claim 13, wherein the signal receiver circuit is further configured to receive the completed version of the communication message from the sending device subsequent to receiving the one or more communication characteristic indicators.

18. The apparatus of claim 13, wherein the representation of the message content further includes an auditory representation of the message content, and/or a tactile representation of the message content.

19. The apparatus of claim 13, wherein the response manager is further configured to initiate a graphical user interface on a user interface in response to receiving the one or more communication characteristic indicators.

20. The apparatus of claim 13, wherein the signal receiver circuit is further configured to receive the one or more communication characteristic indicators from a network entity.

21. The apparatus of claim 13, wherein the signal receiver circuit is further configured to receive the communication message from a network entity.

22. A computer-implemented method of electronic communication, comprising:

transmitting, at a sending device over a network using one or more processors, one or more communication characteristic indicators of message content from an in-progress version of a communication message to a receiving device before completion of the communication message, wherein the one or more communication characteristic indicators include information that is configured to provide a visual representation of the message content from the in-progress version of the communication message without permitting the message content to be perceived, wherein the visual representation of the message content of the in-progress version of the communication message is configured to occupy, within a display screen of the receiving device, an amount of screen area that is based on an amount of the message content included in the in-progress version of the communication message being entered at the sending device; and selectively transmitting, over the network from the sending device to the receiving device based on whether the communication message is completed at the sending device, a completed version of the communication message that includes message content permitted to be perceived at the receiving device.

23. The computer-implemented method of claim 22, further comprising establishing, using the one or more processors, a communication with the receiving device, wherein the one or more communication characteristic indicators are transmitted via the communication.

24. The computer-implemented method of claim 22, wherein the visual representation comprises an obfuscated representation of the message content.

25. The computer-implemented method of claim 22, wherein the visual representation comprises an illegible representation of the message content.

26. The computer-implemented method of claim 22, wherein the selectively transmitting transmits the completed version of the communication message subsequent to transmitting the one or more communication characteristic indicators.

27. The computer-implemented method of claim 22, wherein the transmitting transmits the visual representation of the message content along with an auditory representation of the message content, and/or a tactile representation of the message content.

28. The computer-implemented method of claim 22, wherein the one or more communication characteristic indicators are configured to initiate a graphical user interface on a user interface at the receiving device.

29. The computer-implemented method of claim 22, further comprising transmitting, using the one or more processors, the one or more communication characteristic indicators to a network entity.

30. The computer-implemented method of claim 22, further comprising transmitting, using the one or more processors, the communication message to a network entity.

31. An apparatus including one or more electrical components configured to communicate electronically, comprising:
a memory; and
a processor circuit configured to:
transmit, over a network, one or more communication characteristic indicators of message content from an in-progress version of a communication message to a receiving device before completion of the communication message,
wherein the one or more communication characteristic indicators include information that is configured to provide a visual representation of the message content from the in-progress version of the communication message without permitting the message content to be perceived,
wherein the visual representation of the message content of the in-progress version of the communication message is configured to occupy, within a display screen of the receiving device, an amount of screen area that is based on an amount of the message content included in the in-progress version of the communication message being entered at the apparatus; and
selectively transmit, over the network from the apparatus to the receiving device based on whether the communication message is completed at the apparatus, a completed version of the communication message that includes message content permitted to be perceived at the receiving device.

32. A non-transitory computer-readable medium comprising:
at least one instruction for causing a computer to transmit, over a network, one or more communication characteristic indicators of message content from an in-progress version of a communication message to a receiving device before completion of the communication message,
wherein the one or more communication characteristic indicators include information that is configured to provide a visual representation of the message content from the in-progress version of the communication message without permitting the message content to be perceived,
wherein the visual representation of the message content of the in-progress version of the communication message is configured to occupy, within a display screen of the receiving device, an amount of screen area that is based on an amount of the message content included in the in-progress version of the communication message being entered at the computer; and
at least one instruction for causing the computer to selectively transmit, over the network from the computer to the receiving device based on whether the communication message is completed at the computer, a completed version of the communication message that includes message content permitted to be perceived at the receiving device.

33. An apparatus for electronic communication, comprising:
means for transmitting, over a network, one or more communication characteristic indicators of message content from an in-progress version of a communication message to a receiving device before completion of the communication message,
wherein the one or more communication characteristic indicators include information that is configured to provide a visual representation of the message content from the in-progress version of the communication message without permitting the message content to be perceived,
wherein the visual representation of the message content of the in-progress version of the communication message is configured to occupy, within a display screen of the receiving device, an amount of screen area that is based on an amount of the message content included in the in-progress version of the communication message being entered at the apparatus; and
means for selectively transmitting, over the network from the apparatus to the receiving device based on whether the communication message is completed at the apparatus, a completed version of the communication message that includes message content permitted to be perceived at the receiving device.

34. An apparatus comprising one or more electrical components for electronic communication, the apparatus further comprising:
- a memory; and
- a signal transmitter circuit configured to transmit, over a network, one or more communication characteristic indicators of message content from an in-progress version of a communication message to a receiving device before completion of the communication message,
- wherein the one or more communication characteristic indicators include information that is configured to provide a visual representation of the message content from the in-progress version of the communication message without permitting the message content to be perceived,
- wherein the visual representation of the message content of the in-progress version of the communication message is configured to occupy, within a display screen of the receiving device, an amount of screen area that is based on an amount of the message content included in the in-progress version of the communication message being entered at the apparatus, and
- wherein the signal transmitter circuit is further configured to selectively transmit, over the network from the apparatus to the receiving device based on whether the communication message is completed at the apparatus, a completed version of the communication message that includes message content permitted to be perceived at the receiving device.

35. The apparatus of claim 34, further comprising a communication establishing component configured to establish a communication with the receiving device, wherein the one or more communication characteristic indicators are transmitted via the communication.

36. The apparatus of claim 34, wherein the visual representation comprises an obfuscated representation of the message content.

37. The apparatus of claim 34, wherein the visual representation comprises an illegible representation of the message content.

38. The apparatus of claim 34, wherein the signal transmitter circuit is further configured to transmit the completed version of the communication message subsequent to transmitting the one or more communication characteristic indicators.

39. The apparatus of claim 34, wherein the signal transmitter circuit is configured to transmit the visual representation of the message content along with an auditory representation of the message content, and/or a tactile representation of the message content.

40. The apparatus of claim 34, wherein the one or more communication characteristic indicators are configured to initiate a graphical user interface on a user interface at the receiving device.

41. The apparatus of claim 34, wherein the signal transmitter circuit is further configured to transmit the one or more communication characteristic indicators to a network entity.

42. The apparatus of claim 34, wherein the signal transmitter circuit is further configured to transmit the completed version of the communication message to a network entity.

* * * * *